United States Patent
Kreitzer et al.

(10) Patent No.: US 9,214,975 B2
(45) Date of Patent: Dec. 15, 2015

(54) INTELLIGIBILITY OF OVERLAPPING AUDIO

(71) Applicant: MOTOROLA SOLUTIONS, INC., Schaumburg, IL (US)

(72) Inventors: Stuart S Kreitzer, Coral Springs, FL (US); Jesus F Corretjer, Weston, FL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 118 days.

(21) Appl. No.: 14/087,927

(22) Filed: Nov. 22, 2013

(65) Prior Publication Data

US 2015/0147990 A1   May 28, 2015

(51) Int. Cl.
  *H04B 7/08* (2006.01)
  *H04B 1/16* (2006.01)
  *H04W 88/02* (2009.01)
  *H04M 3/50* (2006.01)
  *H04L 29/06* (2006.01)
  (Continued)

(52) U.S. Cl.
  CPC .............. *H04B 1/16* (2013.01); *H04L 65/4061* (2013.01); *H04M 3/50* (2013.01); *H04M 3/51* (2013.01); *H04W 4/10* (2013.01); *H04W 88/02* (2013.01); *H04L 51/26* (2013.01); *H04M 3/02* (2013.01); *H04W 4/22* (2013.01); *H04W 76/005* (2013.01); *H04W 76/007* (2013.01)

(58) Field of Classification Search
  USPC ......... 455/500, 501, 512, 517, 518, 520, 521, 455/132
  See application file for complete search history.

(56) References Cited

U.S. PATENT DOCUMENTS 5,983,080 A   11/1999   Gerszberg et al.
6,522,878 B1   2/2003   Andrews et al.
(Continued)

FOREIGN PATENT DOCUMENTS

EP   2374290 A1   10/2011
WO   9831139 A1   7/1998
(Continued)

OTHER PUBLICATIONS

Arindam Saha, "A Simulator for Real-Time Parallel Processing Architectures", Proceedings of the 28th Annual Simulation Symposium, IEEE, pp. 74-83, year: 1996.
(Continued)

*Primary Examiner* — Nguyen Vo
(74) *Attorney, Agent, or Firm* — Daniel R. Bestor (57) ABSTRACT

A method and apparatus are provided by which a radio communication device with multi-watch receivers improves the comprehension of a high-priority message when the high-priority message is overlapped in time with a normal-priority message. A first receiver of the radio communication device receives a first incoming message over a first channel, and a second receiver of the radio communication device receives a second incoming message over a second channel. The radio communication device, upon receiving the first and second incoming messages, detects that a portion of the first incoming message overlaps in time with a portion of the second incoming message. The radio communication device further determines whether at least one of the first or the second incoming message is a high-priority message and repeats the determined high-priority message when at least one of the first or second incoming messages is a high-priority message.

20 Claims, 8 Drawing Sheets

(51) Int. Cl.
    *H04M 3/51*     (2006.01)
    *H04W 4/10*     (2009.01)
    *H04L 12/58*     (2006.01)
    *H04M 3/02*     (2006.01)
    *H04W 4/22*     (2009.01)
    *H04W 76/00*     (2009.01)

(56) References Cited

U.S. PATENT DOCUMENTS

| | | |
|---|---|---|
| 7,090,582 B2 | 8/2006 | Danieli et al. |
| 7,171,491 B1 | 1/2007 | O'Toole et al. |
| 7,263,545 B2 | 8/2007 | Digate et al. |
| 7,280,133 B2 | 10/2007 | Lord |
| 7,324,802 B2 | 1/2008 | Jennings |
| 8,340,256 B2 | 12/2012 | Jorgensen et al. |
| 8,849,225 B1 * | 9/2014 | Sullivan .................... 455/179.1 |
| 2003/0235407 A1 * | 12/2003 | Lord .............................. 386/96 |
| 2005/0210394 A1 | 9/2005 | Crandall et al. |
| 2006/0160522 A1 | 7/2006 | Jennings |
| 2007/0197248 A1 | 8/2007 | Reich et al. |
| 2008/0095338 A1 * | 4/2008 | Cosky ........................ 379/88.22 |
| 2009/0010403 A1 * | 1/2009 | Jorgensen et al. ........ 379/88.23 |

FOREIGN PATENT DOCUMENTS

| | | |
|---|---|---|
| WO | 2008049061 A2 | 4/2008 |
| WO | 2010065177 | 6/2010 |
| WO | 2013015694 A1 | 1/2013 |

OTHER PUBLICATIONS

PCT International Search Report Dated Feb. 20, 2015 for Counterpart Application PCT/US2014/064788.

* cited by examiner

INTELLIGIBILITY OF OVERLAPPING AUDIO

FIELD OF THE DISCLOSURE

The present disclosure relates generally to multi-watch radio communication devices, and more particularly to multi-watch radio communication devices for improving the comprehension of mission critical communication.

BACKGROUND

In the current public safety communication systems, a public safety officer may need to monitor multiple talk groups simultaneously. This is accomplished by using a multi-watch radio communication device to listen to the multiple talk groups simultaneously by tuning multiple receivers to different talk groups and playing the overlapping audio streams through one or more speakers. In various multi-watch radio communication devices, the audio streams received by the multiple receivers are combined and played through a single speaker. Alternatively, the audio streams from different talk groups are played on different speakers. For example, the audio from the first talk group is played on a left speaker of the radio communication device and the audio from the second talk group is played on a right speaker of the radio communication device or the audio from the first talk group is played on an earpiece and the audio from the second talk group is played on a speaker, etc. While routing the audio streams from the first talk group and the second talk group over physically separate combinations of speakers and earpieces may provide some benefit in comprehending overlapping calls, the public safety officers may experience reduced comprehension and potentially miss critical information when the audio streams received simultaneously from the multiple talk groups overlap in time.

Thus, there is a need to have a mechanism for radio communication devices with multi-watch receivers to detect overlapping calls and replay the audio streams containing critical information.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Briefly, in accordance with the various embodiments, there is described herein, a method and apparatus by which a radio communication device with multi-watch receivers improves the comprehension of a high-priority message when the high-priority message is overlapped in time with a normal-priority message. The present disclosure utilizes the multi-watch radio communication device in which two or more receivers of the radio communication device receive incoming messages from two or more different channels. As described in detail below, a first receiver of the radio communication device receives a first incoming message over a first channel, and a second receiver of the radio communication device receives a second incoming message over a second channel. The radio communication device, upon receiving the first and second incoming messages, detects that a portion of the first incoming message overlaps in time with a portion of the second incoming message. The radio communication device further determines whether at least one of the first or the second incoming message is a high-priority message and repeats the determined high-priority message(s) when at least one of the first or second incoming messages is the high-priority message. In accordance with various embodiments, the radio communication device replays both the first incoming message and the second incoming message sequentially when none of the first incoming message and the second incoming message is determined to be high-priority message.

Figure 1:
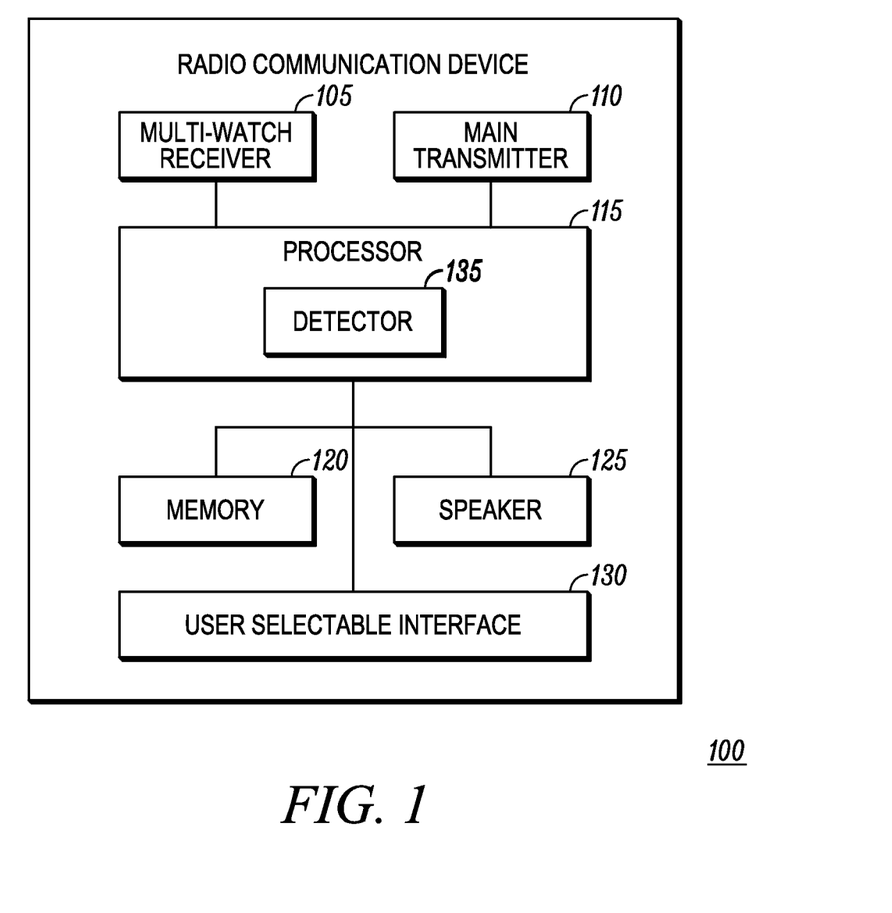
FIG. 1 is a block diagram of a radio communication device in accordance with the various embodiments of the present disclosure.

FIG. 1 is a block diagram of a radio communication device 100 operating in accordance with various embodiments. The radio communication device 100 comprises a multi-watch receiver 105, a main transmitter 110, a processor 115, a memory 120, a speaker 125, and a user selectable interface 130. In accordance with various embodiments, the multi-watch receiver 105 comprises a primary receiver tuned to a primary channel. The primary channel is a home channel selected by the user to perform basic communication functionality. In accordance with the various embodiments, the primary channel is a channel on which a user of the radio communication device 100 is more likely to receive high-priority messages. The multi-watch receiver 105 further comprises one or more of secondary receivers tuned to one or more of secondary channels. In accordance with various embodiments, the multi-watch receiver 105 in the radio communication device 100 allows the user of the radio communication device 100 to receive a plurality of incoming messages simultaneously from various talks groups tuned to different channels. In accordance with various embodiments, the incoming messages received by the radio communication device 100 are audio messages or audio video messages (i.e. video messages with audio). The main transmitter 110 of the radio communication device 100 can be tuned to communicate over various channels on which the radio communication device is programmed to talk to one or more peers, for example, other radio communication devices, in the radio-to-radio mode. The main transmitter 110 and the primary receiver of the multi-watch receiver together form a wireless transceiver to enable bi-directional wireless communication with other devices.

The processor 115 includes one or more microprocessors, microcontrollers, DSPs (digital signal processors), state machines, logic circuitry, or any other device or devices that process information based on operational or programming instructions. The processor 115 of the radio communication device 100 includes a detector 135 for detecting whether a portion of the two or more incoming messages received by the primary and secondary receivers are overlapping in time. The processor 115, upon detecting that the portion of the two or more incoming messages are overlapping in time, determines whether any of the two or more overlapping messages is a priority message and replays the determined priority message automatically or based on user's input when at least one of the two or more overlapping messages is a priority message. When the determined priority message is a video message with audio, the audio and video of the message is replayed by the processor 115. In accordance with one embodiment the processor 115 replays the determined priority message when the portion of overlapping portion of the two or more incoming messages exceeds a predetermined threshold. In accordance with another embodiment, the processor 115 repeats the two or more overlapping messages when all of the two or more overlapping messages are determined to be high-priority messages.

In accordance with various embodiments, the processor 115 of the radio communication device 100 determines a priority of the two or more incoming messages and selectively replays the two or more incoming messages based on the determined priority on one or more speakers 125. FIG. 1 shows the radio communication device 100 comprising one speaker 125, however a person with ordinary skill in the art would appreciate that the radio communication device 100 can comprise more than one speaker 125. In accordance with one embodiment, the processor 115 replays the incoming messages of different priorities sequentially on a single speaker 125. In accordance with another embodiment, the processor 115 replays the incoming messages of the same priority sequentially on the single speaker 125.

Further, in accordance with another embodiment, the processor 115 stops the replay of the high-priority message(s) when a new call is received by the radio communication device 100. Further, in accordance with another embodiment, the processor 115 suppresses replay of the messages when a busy channel condition is detected on a channel receiving high-priority messages. In addition to suppressing the replay of the messages, the processor is further configured to suppress the audio in the normal-priority messages received on other channels when a busy channel condition is detected on a channel receiving high-priority messages.

The radio communication device 100 further comprises the memory 120 for storing the plurality of incoming messages. The processor 115 on determining that one or more of the overlapping messages is a priority message(s), retrieves the priority message from the memory 120 and replays the priority message through the speaker 125 as an output. In accordance with another embodiment, the processor 115 replays the determined priority message over more than one speaker 125 of the radio communication device.

In accordance with various embodiments, the user of the radio communication device 100 can manually select the message to be replayed, for example, through scroll up/down button on the user selectable interface 130. In accordance with various embodiments, the processor 115 superimposes side tones on the replayed messages in order to indicate to the user that the message is a replayed message. The processor 115 assigns different side tones for the messages received on the different channels so that the user can distinguish the source of the replayed messages based on the side-tones. The side tones can be audio tones, audio signal, noise, or music.

Figure 2:
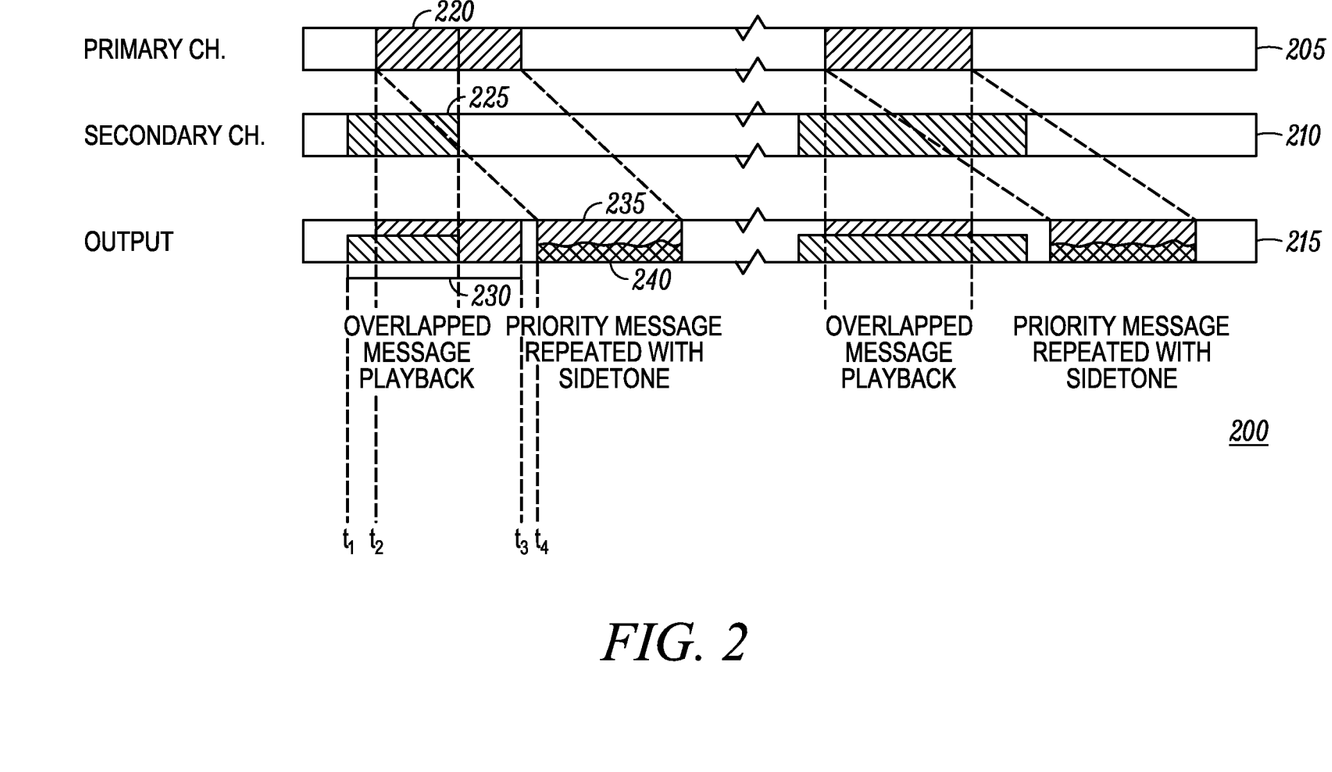
FIG. 2 is an exemplary audio timing diagram of improved intelligibility of overlapping radio obtained by the radio communication device in accordance with the various embodiments of the present disclosure.

FIG. 2 is an exemplary audio timing diagram 200 of improved intelligibility of overlapping radio obtained by the radio communication device in accordance with the various embodiments. FIG. 2 shows a primary channel 205 and a secondary channel 210 to which the receivers of the multi-watch receiver 105 of the radio communication device 100 are tuned. For exemplary purposes, only one secondary channel is shown in FIG. 2, one skilled in the art would appreciate that there can be more than one secondary channels on which the multi-watch receiver 105 of the radio communication device 100 can receive audio messages from different talk groups simultaneously. As shown in FIG. 2, the radio communication device 100, at instance t1, receives a first audio message 225 over the secondary channel 210. The radio communication device 100, upon receiving the first audio message 225, starts playing the first audio message 225 as an output 215 to the user. Further, at instance t2, the radio communication device 100 further receives a second audio message 220 over the primary channel 205. The radio communication device 100, upon receiving the second audio message 220, starts playing the second audio message 220 as an output 215 to the user. However, at this instance t2, since the first audio message 225 is already being played, the playing of the second audio message 220 simultaneously with the first audio message 225 results in the overlapping (shown as 230) of the first audio message 225 and the second audio message 220. The overlapping of the first audio message 225 and the second audio message 220 may cause the user of the radio communication device 100 to miss critical information present in any of the first audio message 225 or the second audio message 220.

In accordance with various embodiments, the radio communication device 100 detects the overlapping of the first audio message 225 and the second audio message 220 and determines whether any of the first audio message 225 or the second audio message 220 is a priority message. The radio communication device 100, upon determining that one of the first audio message 225 or the second audio message 220 is a priority message replays the determined priority message after both the first audio message 225 and the second audio message 220 complete playing in real-time.

The priority of the audio message is determined based on one or more of information content of the audio message, a channel on which the audio message is received, talk group of the audio message, audio quality of the audio message, sender of the audio message, type of audio message, and volume of the audio message. In accordance with some embodiments, the radio communication device 100 prioritizes the audio message with the poorest signal to noise ratio. In accordance with another embodiment, the radio communication device 100 prioritizes the audio message with lower volume as the lower volume audio messages are harder to hear. In accordance with various embodiments, the priority of the audio message is determined by the user and the replay of the determined priority message is initiated by a manual input provided by the user to the radio communication device 100. Alternatively, the user can use scroll up or down button on the user selectable interface to raise or lower the priority of a message, channel, talk group or the sender.

In the example shown in FIG. 2, the second audio message 220 received on the primary channel 205 is determined, by the radio communication device 100, as a priority message containing critical information and is being replayed as audio message 235 at instance t4 after both the first audio message 225 and the second audio message 220 complete playing in real-time at instance t3. In accordance with various embodiments, an audible side tone 240 is superimposed on the audio message 235 being replayed. The side tone 240 indicates to the user that the audio message is a repeated message and not a real-time message. The side tones are chosen such that it clearly distinguishes message repeats from real-time messages and yet not diminish intelligibility of the repeated audio messages. The side tones 240 can include, but is not limited to tones, shaped noise, music samples etc.

In accordance with various embodiments, the radio communication device 100 is capable of receiving video messages on the primary channel 205 and the secondary channel 210. The radio communication device 100 replays an audio and video of a higher priority video message when the higher priority message is overlapped with other normal-priority messages received simultaneously by the radio communication device 100.

Figure 3:
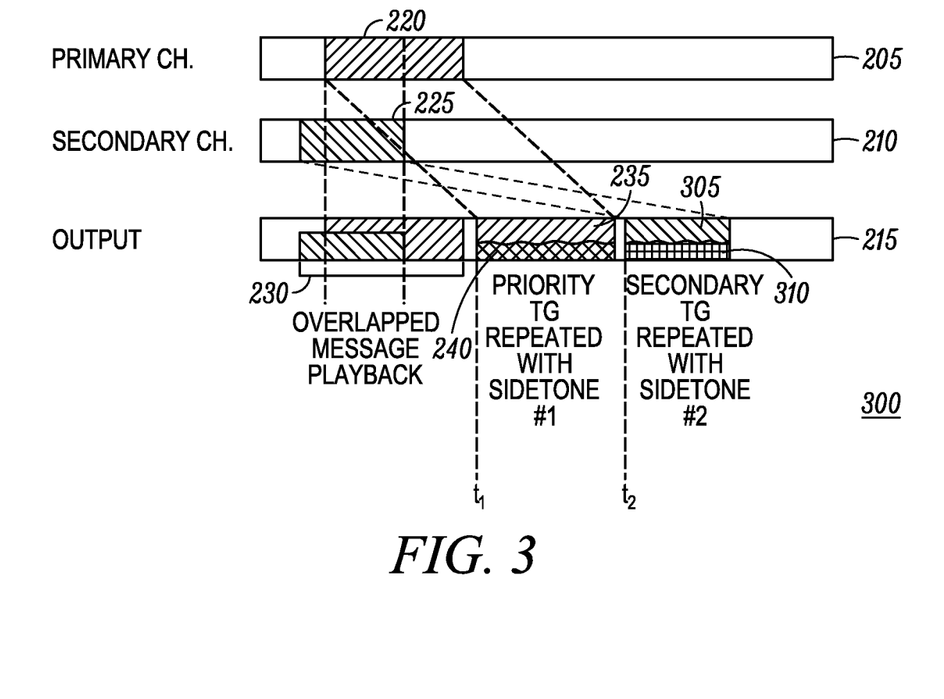
FIG. 3 is another exemplary audio timing diagram of improved intelligibility of overlapping radio obtained by the radio communication device in accordance with the various embodiments of the present disclosure.

Further, in accordance with one embodiment, the radio communication device 100 may determine that both the first audio message 225 and the second audio message 220 needs to be replayed. In such scenarios, as shown in FIG. 3, the radio communication device 100 replays both the first audio message 225 and the second audio message 220 as messages 305 and 235 respectively after both the first audio message 225 and the second audio message 220 complete playing in real-time. In accordance with various embodiments, the sequence of the replay of the first audio message 225 and the second audio message 220 is determined based on the priority of the first and the second audio messages (225, 220). As shown in FIG. 3, the second audio message 220 is determined as higher-priority message as compared to the first audio message 225, thus the second audio message 220 is played first at instance t1 and the first audio message is played later at instance t2 after the second audio message 220 has competed replaying. In accordance with another embodiment, the user of the radio communication device 100 replays both the first audio message 225 and the second audio message 220 as messages 235 and 305 respectively by providing manual input to the radio communication device 100. In accordance with various embodiments, different side tones (240, 310) are used for replaying messages (220, 225) received from different talk groups on different channels. The use of audibly distinguishable side tones helps the user identify the source of the replayed message. As shown in FIG. 3, the first audio message 225 is replayed as message 305 along with a first side tone 310 and the second audio message 220 is replayed as message 235 along with a second side tone 240.

Figure 4:
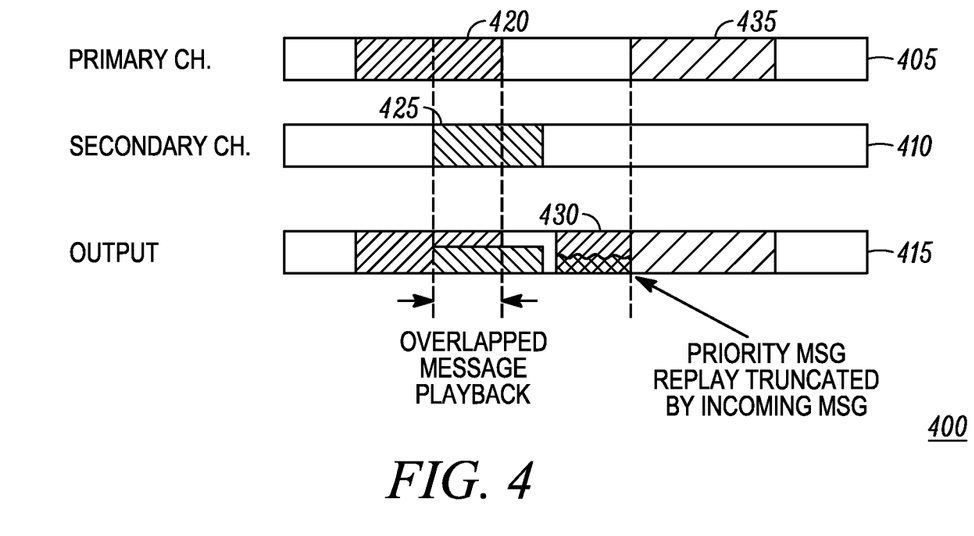
FIG. 4 is another exemplary audio timing diagram of improved intelligibility of overlapping radio obtained by the radio communication device in accordance with the various embodiments of the present disclosure.

The replaying of the priority messages increases the comprehension of critical information when the priority message overlaps with simultaneously received audio messages. In accordance with another embodiment, the replaying of the priority or non-priority messages should be stopped/halted immediately if a new incoming audio message is received. FIG. 4 shows repeat playback 430 of the overlapping priority audio message 420. However, during repeat playback 430, a new audio message 435 is received which immediately stops and truncates repeat playback 430 and plays the new audio message 435. In accordance with various embodiments, an optional indication may also be played to indicate the transition from repeat playback of the overlapping priority audio message 420 to the new audio message 435.

Since the user of the radio communication device 100 typically monitors independent channels, the message overlap is random and asynchronous. In scenarios when only a small part of the first audio message overlaps with the second audio message (e.g. <0.5 sec), the priority message is not replayed.

Figure 5:
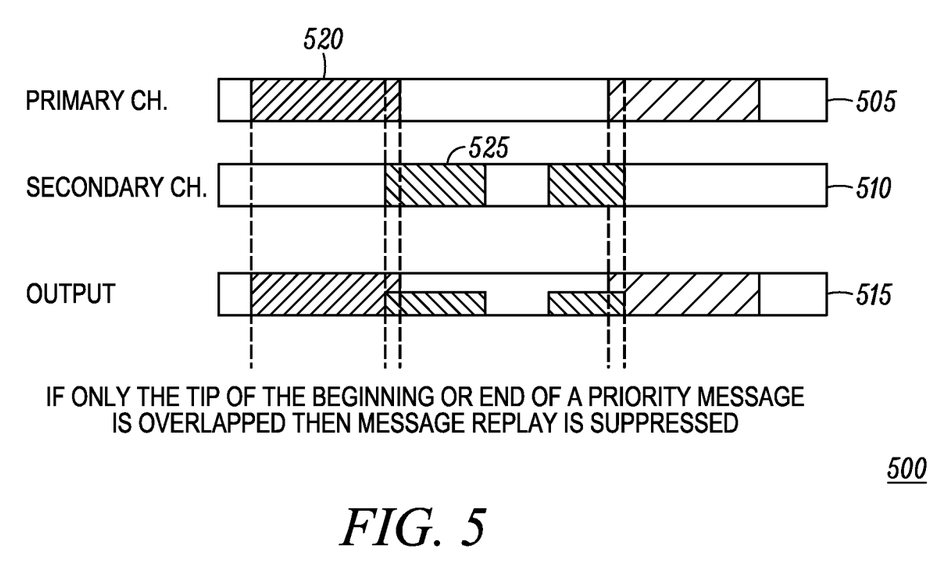
FIG. 5 is another exemplary audio timing diagram of improved intelligibility of overlapping radio obtained by the radio communication device in accordance with the various embodiments of the present disclosure.

FIG. 5 is another exemplary audio timing diagram of improved intelligibility of overlapping radio obtained by the radio communication device in accordance with the various embodiments. As shown in FIG. 5, the first audio message 520 received on the primary channel 505 overlaps with the second audio message 525 received on the secondary channel 510. However, in this case, the overlap between the first audio message 520 and the second audio message 525 is less than a predetermined threshold value, thus the message replay of a higher priority message is suppressed.

Figure 6:
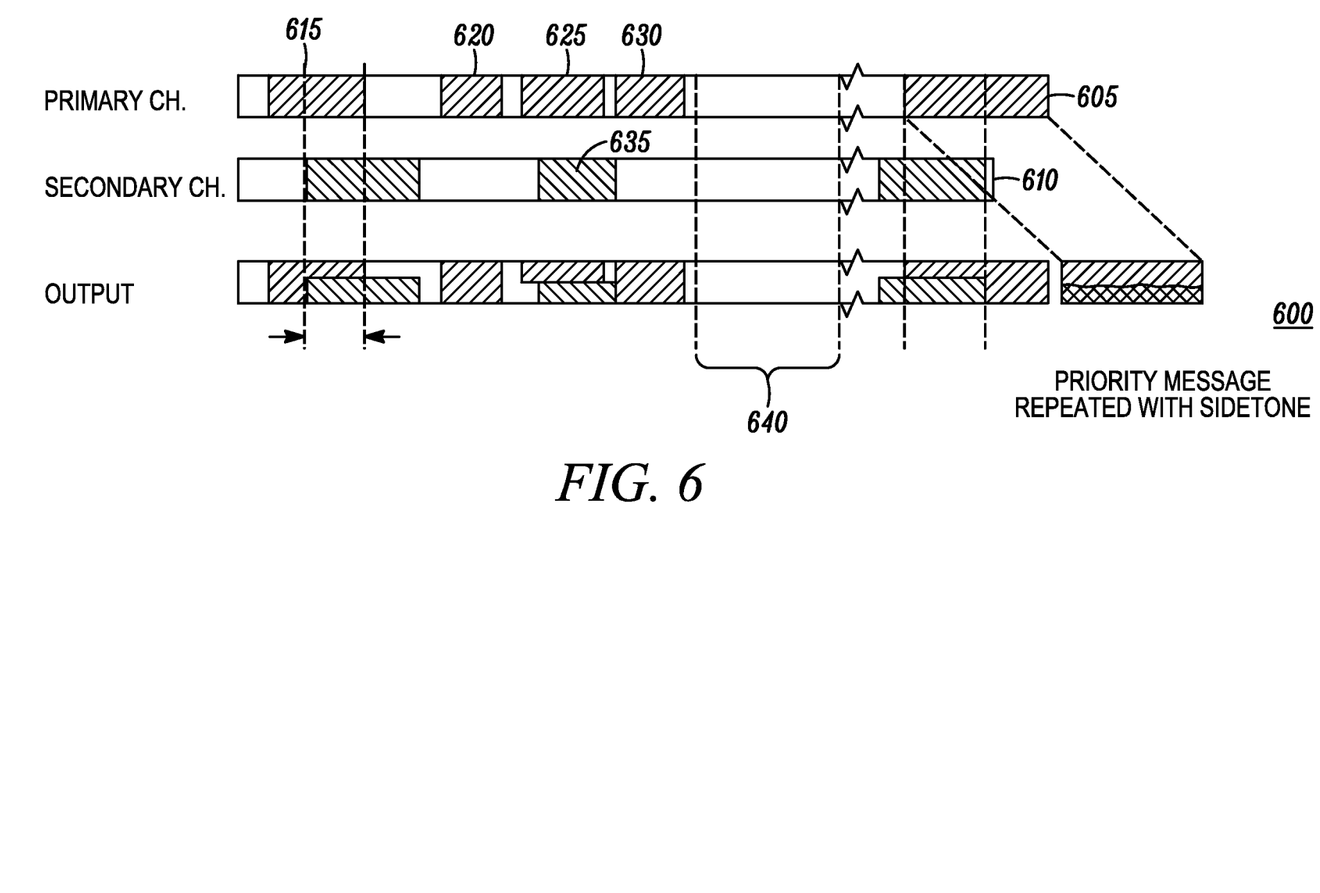
FIG. 6 is another exemplary audio timing diagram of improved intelligibility of overlapping radio obtained by the radio communication device in accordance with the various embodiments of the present disclosure.

FIG. 6 is another exemplary audio timing diagram of improved intelligibility of overlapping radio obtained by the radio communication device in accordance with the various embodiments. In some instances, particularly if a major incident is unfolding, the primary channel 605 may become very busy with call traffic leaving little quiet time to play message repeats. Therefore, in such cases, the radio communication device 100 upon detecting that the primary channel 605 has become excessively busy, suppresses the replay of the received priority messages. In accordance with various embodiments, the radio communication device 100 detects the traffic status of the primary channel 605 by monitoring the idle time on the primary channel 605 and when the idle time drops below a threshold, the radio communication device 100 temporarily suppresses the replays of the priority messages. The replays of the priority messages are restored once primary channel traffic returns to normal levels. There are a number of ways to detect an excessively busy channel and temporarily suppress repeats, for example: monitor idle time on the primary channel 605 and suppress repeats if a sliding window measuring idle time falls below a threshold, monitor the number of truncated message repeats during a sliding window that represents recent channel activity. If the number of truncated repeats exceeds a threshold then repeats are suppressed until primary channel activity drops below a threshold, voice activity detector that monitors the aggregate voice activity across all of the talk groups being monitored and suppresses repeats if a sliding window measuring total voice activity exceeds a threshold, and other heuristics that measure primary channel activity and back-off from playing repeats when activity rises above a threshold.

FIG. 6 shows an example of a busy primary channel 605 in which audio messages 615, 620, 625, and 630 are received in close succession. Since the audio messages 615, 620, 625, and 630 are received in close succession there is an insufficient gap to replay priority messages. In such scenarios, the radio communication device 100, upon detecting the busy status of the primary channel 605, suppresses the replay of any priority messages until sufficient idle time 640 is detected on the primary channel. Once the radio communication device 100 detects the idle status of the primary channel 605 for a particular duration, the radio communication device 100 returns to its normal operation and replays the priority messages. In accordance with various embodiments, a channel is determined to be idle based on one or more of measure of traffic and lack of voice activity on the channel.

Figure 7:
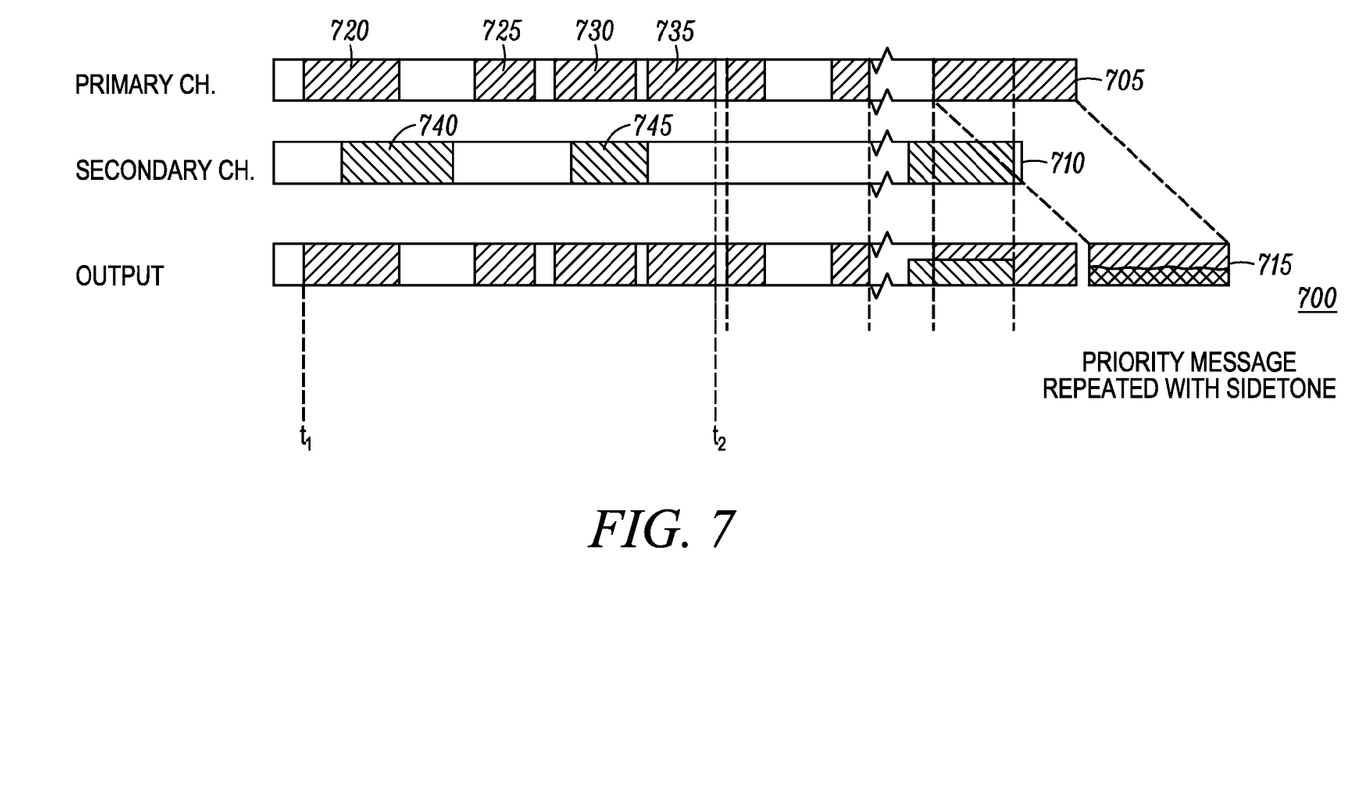
FIG. 7 is another exemplary audio timing diagram of improved intelligibility of overlapping radio obtained by the radio communication device in accordance with the various embodiments of the present disclosure.

FIG. 7 is another exemplary audio timing diagram of improved intelligibility of overlapping radio obtained by the radio communication device in accordance with the various embodiments. In accordance with one embodiment, the user of the radio communication device 100 configures the radio communication device 100 to suppress the audio messages received on other channels receiving normal-priority messages, in addition to suppressing message repeats, whenever the radio communication device 100 detects a busy channel condition on any of its channels receiving high-priority audio messages. The suppression of the audio on other channels receiving normal-priority messages improves the comprehension of critical/high priority audio messages received on the busy channel(s). In accordance with some embodiments, the suppression of the audio received on the channels receiving normal-priority messages is done based upon the manual input received from the user. Further, once the traffic on the channel receiving the high-priority messages returns to a normal traffic level, the radio communication device 100 returns to its normal operation and replays the overlapped high priority audio messages in either a manual or automatic fashion.

FIG. 7 shows a busy channel 705 receiving a plurality of high-priority audio messages 720, 725, 730, and 735 within a short interval of time (t1-t2). In accordance with various embodiments of the present invention, the radio communication device 100, upon receiving a manual input from the user or detecting the busy channel conditions and the high-priority of the audio messages received on the primary channel 705 suppresses the normal-priority audio messages 740 and 745 received on the secondary channel 710 of the radio communication device 100. In such scenarios, the user of the radio communication device 100 would be able to only listen to the high-priority audio messages 720, 725, 730, and 735 received on the primary channel 705 (as the normal-priority audio messages 740 and 745 received on the secondary channel 710 are suppressed and are not audible by the user of the radio communication device 100). Further, once the traffic on the primary channel becomes normal, the radio communication device 100 resumes its normal operation and stops suppressing the audio messages received on the secondary channel 710.

Figure 8:
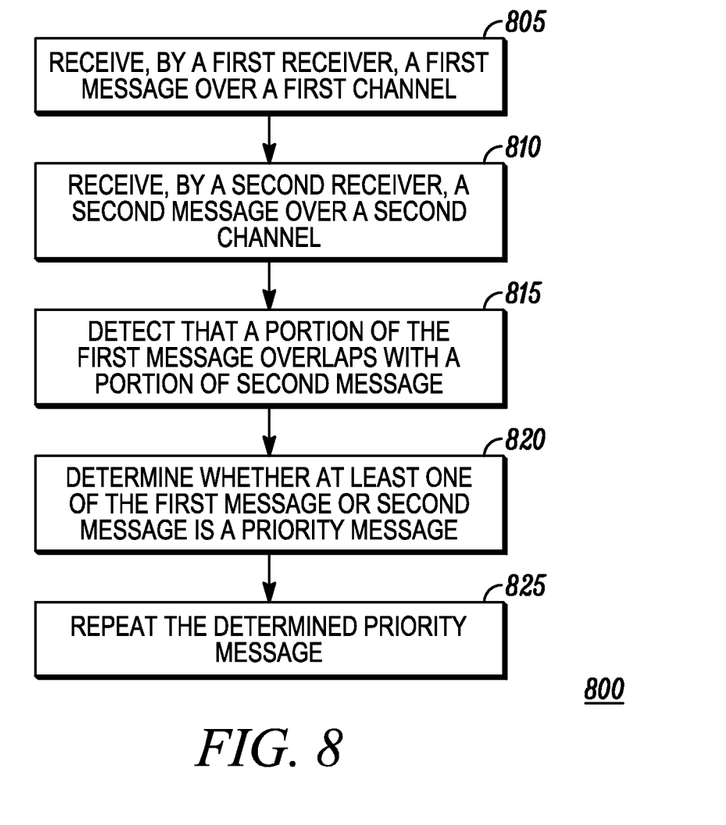
FIG. 8 is a flow diagram for improving intelligibility of overlapping audio in radio communication device in accordance with the various embodiments of the present disclosure.

FIG. 8 is a flow chart 800 for improving intelligibility of overlapping audio in radio communication device 100 in accordance with the various embodiments. The radio communication device 100 includes a multi-watch receiver for receiving messages from multiple channels simultaneously by tuning each receiver of the multi-watch receiver to different channels. At 805, a first receiver of the radio communication device 100 receives a first message over a first channel. Similarly, a second receiver of the radio communication device 100 receives a second message over a second channel. In accordance with some embodiments, the first channel is a primary channel of the radio communication device 100. In accordance with various embodiments, the first and the second messages are audio messages or video messages with audio.

The radio communication device 100, upon receiving the first message and the second message, detects that a portion of the first message overlaps with a portion of the second message at 815. At 820, the radio communication device 100 determines whether at least one of the first message or the second message is a priority message. In accordance with various embodiments, the priority of the message is determined based on one or more of information content of the message, a channel on which the message is received, talk group of the message, quality of the audio of the message, sender of the message, type of message, and volume of the audio in the message.

Further, at 825, the radio communication device 100, upon determining that the at least one of the first message and the second message is the priority message, repeats the determined priority message after both the first message and the second message complete playing in real-time. In accordance with some embodiments, the determined priority message is repeated with a side tone in order to help the user distinguish the replayed messages from original messages received.

In accordance with various embodiments, the usability of the multi-watch radio communication device 100 may be further enhanced by using heads-up, wearable, and other ergonomic displays that visually displays the status of the primary and the secondary channels of the radio communication device 100. In some embodiments, the display may notify the user when a message is being replayed and the relation of the replayed message to an original overlapped message. The user of the radio communication device can also selectively route the high-priority messages and repeat messages to a selected speaker.

In multi-watch radio communication devices 100, high priority and normal priority calls may occur simultaneously. The radio communication device formed and operating in accordance with the various embodiments. In accordance with various embodiments, when two or more incoming calls overlap in time, a set of rules may be applied to repeat the higher-priority calls among the two or more overlapping calls, either manually or automatically. The high-priority call is replayed after two or more overlapping messages complete playing in real-time. This prevents the user from missing any critical information received in the received audio messages.

In accordance with one embodiment, the radio communication device 100 selectively replays the incoming audio messages based on the determined priority of the messages. The radio communication device 100 either replays both the incoming audio messages of different priorities on a single speaker of the radio communication device 100 or replays the incoming audio messages of same priority on the single speaker of the radio communication device 100.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method for communicating using a radio communication device comprising a plurality of receivers, the method comprising:
   receiving, by a first receiver of the plurality of receivers of the radio communication device, a first audio message over a first channel and playing back the first audio message;
   receiving, by a second receiver of the plurality of receivers of the radio communication device, a second audio message over a second channel and playing back the second audio message;
   detecting, by the radio communication device, that a played back portion of the first audio message overlaps in time with a played back portion of the second audio message;
   determining, by the radio communication device, that one of the first audio message and the second audio message is a priority audio message; and
   after completion of play back of both the first and second audio messages, repeating the playing back, by the radio communication device, of the determined priority audio message.

2. The method of claim 1, further comprising:
   receiving, by a third receiver of the plurality of receivers of the radio communication device, a third audio message over a third channel; and
   repeating, by the radio communication device, the third audio message when the third audio message is determined as the priority audio message by the radio communication device.

3. The method of claim 1, wherein the first and the second audio messages are audio video messages.

4. The method of claim 3, wherein audio and video is repeated when the determined priority audio message is an audio video message.

5. The method of claim 1, wherein detecting whether the played back portion of the first audio message overlaps with the slaved back portion of the second audio message comprises detecting whether the played back portion of the first audio message and the played back portion of the second audio message is being played back simultaneously at the radio communication device.

6. The method of claim 1, wherein the priority of the priority audio message is determined based on one or more of: information content of the priority audio message, a channel on which the priority audio message is received, a talk group on which the priority audio message is received, an audio quality of the priority audio message, a sender of the priority audio message, a type of the priority audio message, and a volume of audio in the priority audio message.

7. The method of claim 1, wherein the received first and second audio messages are played in real-time starting from a time period the first and second audio messages are received and the priority audio message is repeated after both the first audio message and the second audio message complete playing in real-time.

8. The method of claim 1, wherein both the first and second audio messages are determined to have a same priority and further wherein both the first and second audio messages are repeated sequentially by the radio communication device after completion of real-time play back of both the first and second audio messages.

9. The method of claim 8, wherein different side tones are superimposed during respective sequential repeated playback of the first audio message and the second audio message.

10. The method of claim 1, wherein repeating of the determined priority audio message is enabled by a manual input to the radio communication device.

11. The method of claim 1, wherein a side tone is superimposed on the repeated priority audio message to distinguish the repeated priority audio message from the prior real-time play back of the audio message.

12. The method of claim 1, wherein a side tone is superimposed on the repeated priority audio message to identify a source of the repeated priority audio message.

13. The method of claim 1, wherein the repeating of the determined priority audio message is ceased when a new incoming audio message is received by the radio communication device.

14. A radio communication device, comprising:
   a plurality of receivers for receiving incoming audio messages;
   a memory for storing incoming audio messages;
   one or more speakers for playing back audio messages; and a controller configured to:
  receive, via a first receiver of the plurality of receivers, a first audio message over a first channel and play back, via the one or more speakers, the first audio message;
  receive, via a second receiver of the plurality of receivers, a second audio message over a second channel and play back, via the one or more speakers, the second audio message;
  detect that a played back portion of the first audio message overlaps in time with a played back portion of the second audio message;
  determine that one of the first audio message and the second audio message is a priority audio message; and
  after completion of play back of both the first and second audio messages, repeat the play back, via the one or more speakers, of the determined priority audio message.

15. The radio communication device of claim 14, wherein the controller is further configured to superimpose a side tone on the repeated priority audio message to distinguish the repeated priority audio message from the prior real-time play back of the audio message.

16. The radio communication device of claim 14, further comprising a user selectable interface for selectively enabling repeating of the priority audio message.

17. The radio communication device of claim 14, wherein the controller determines the priority of the priority audio message based one or more of: an information content of the priority audio message, a channel on which the priority audio message is received, a talk group on which the priority audio message is received, an audio quality ratio of the priority audio message, a sender of the priority audio message, a type of message of the priority audio message, and a volume of audio in the priority audio message.

18. The radio communication device of claim 14, wherein the received first and second audio messages are played in real-time starting from a time period the first and second audio messages are received and the priority audio message is repeated after both the first audio message and the second audio message complete playing in real-time.

19. The radio communication device of claim 14, wherein the controller is further configured to superimposes a side tone on the repeated priority audio message to identify a source of the repeated priority audio message.

20. The radio communication device of claim 14, wherein the controller is further configured to cease replay of the priority audio message when a new incoming audio message is received by the radio communication device.

* * * * *